US012566931B2

(12) United States Patent
Chung et al.

(10) Patent No.: US 12,566,931 B2
(45) Date of Patent: Mar. 3, 2026

(54) SYSTEMS AND METHODS FOR ELECTROSTATIC DISCHARGE PROTECTION

(71) Applicant: Stripe, LLC, South San Francisco, CA (US)

(72) Inventors: Jay Chung, Tsuen Wan (HK); Bryan Mok, Tsuen Wan (HK); Tony Tsang, Tsuen Wan (HK); Steven Wong, Tsuen Wan (HK); Wayne Gan, Tsuen Wan (HK)

(73) Assignee: Stripe, LLC, South San Francisco, CA (US)

( * ) Notice: Subject to any disclaimer, the term of this patent is extended or adjusted under 35 U.S.C. 154(b) by 518 days.

(21) Appl. No.: 17/939,172

(22) Filed: Sep. 7, 2022

(65) Prior Publication Data

US 2023/0074863 A1 Mar. 9, 2023

Related U.S. Application Data

(60) Provisional application No. 63/241,664, filed on Sep. 8, 2021.

(51) Int. Cl.
*G06K 7/00* (2006.01)
*G06K 19/02* (2006.01)

(52) U.S. Cl.
CPC ......... *G06K 7/0082* (2013.01); *G06K 7/0008* (2013.01); *G06K 19/022* (2013.01)

(58) Field of Classification Search
CPC ... G06K 7/0082; G06K 7/0008; G06K 19/022

USPC ........................................................ 361/737
See application file for complete search history.

(56) References Cited

U.S. PATENT DOCUMENTS 5,892,216 A * 4/1999 Grant .................. G06K 7/0082
235/441
8,544,743 B2 * 10/2013 Hong .................. G06K 7/0082
235/441

OTHER PUBLICATIONS

Simona AG, Electrically conductive plastics, Jan. 12, 2016, retrieved from https://www.simona.de/en/service/atex/simona-solutions/electrically-conductive-plastics/ on Sep. 5, 2021.

* cited by examiner

*Primary Examiner* — Imani N Hayman
*Assistant Examiner* — Ross Terry Mularski
(74) *Attorney, Agent, or Firm* — BAKERHOSTETLER

(57) ABSTRACT

A system for prevention of electrostatic discharge from a payment card to a point of sale (POS) device comprising an integrated circuit card (ICC) socket, includes a spring member comprising a first end electrically coupled to a second end. The first end is electrically coupled to an electrical ground, the first end is mechanically coupled to the POS device, and the second end is positioned for contact with a top edge of the payment card. When the payment card is inserted into the ICC socket and the top edge comes into contact with the second end, the first end and the second end form a first electrical path for electrostatic discharge between the payment card and the electrical ground.

20 Claims, 7 Drawing Sheets

SYSTEMS AND METHODS FOR ELECTROSTATIC DISCHARGE PROTECTION

CROSS-REFERENCE TO RELATED APPLICATIONS

This application claims benefit of U.S. Provisional Application No. 63/241,664, filed Sep. 8, 2021, entitled SYSTEMS AND METHODS FOR ELECTROSTATIC DISCHARGE PROTECTION, the entire content of which is incorporated by reference herein in its entirety.

TECHNICAL FIELD

This application relates to protection of electronic devices against electrostatic discharge, specifically point of sale devices.

SUMMARY

This disclosure relates to systems and methods for electrostatic discharge protection.

In one example embodiment, a system for prevention of electrostatic discharge from a payment card to a point of sale (POS) device comprising an integrated circuit card (ICC) socket, includes a spring member comprising a first end electrically coupled to a second end. The first end is electrically coupled to an electrical ground, the first end is mechanically coupled to the POS device, and the second end is positioned for contact with a top edge of the payment card. When the payment card is inserted into the ICC socket and the top edge comes into contact with the second end, the first end and the second end form a first electrical path for electrostatic discharge between the payment card and the electrical ground.

In one or more of the above examples, as the payment card is inserted, a spring action causes the second end to exert an increasing force against the edge of the payment card.

In one or more of the above examples, the second end comprises a curved segment, and the curved segment comes into contact with the top edge.

In one or more of the above examples, the spring member is made using a conductive material.

In one or more of the above examples, the conductive material is a metal.

In one or more of the above examples, the spring member is a pin.

In one or more of the above examples, the ICC socket is made from an electrically conductive plastic, the ICC socket is electrically coupled to the electrical ground, and whereby when at least one edge of the payment card comes into contact with the ICC socket, a second electrical path for electrostatic discharge between the payment card and the electrical ground is formed.

In one or more of the above examples, the exerting of the increasing force lowers an impedance of the first electrical path.

In another example embodiment, a system for prevention of electrostatic discharge from a payment card to a point of sale (POS) device comprising an integrated circuit card (ICC) socket includes a contact element comprising a first end electrically coupled to a second end. The first end is electrically coupled to an electrical ground, and the second end is positioned for contact with a side edge of the payment card. When the payment card is inserted into the ICC socket and the side edge of the payment card comes into contact with the second end, the first end and the second end form a first electrical path for electrostatic discharge between the payment card and the electrical ground.

In one or more of the above examples, the contact element comprises a spring mechanism which exerts a force against the side edge.

In one or more of the above examples, the exerting of the force improves the contact between the second end and the side edge, thereby lowering an impedance of the first electrical path for electrostatic discharge.

In one or more of the above examples, the side edge is either a left or a right side edge.

In one or more of the above examples, the ICC socket is made from an electrically conductive plastic, the ICC socket is electrically coupled to the electrical ground, and whereby when at least one edge of the payment card comes into contact with the ICC socket, a second electrical path for electrostatic discharge between the payment card and the electrical ground is formed.

In another example embodiment, a method for prevention of electrostatic discharge from a payment card to a point of sale (POS) device, wherein the POS device comprises an integrated circuit card (ICC) socket and a spring member including a first end electrically coupled to a second end, wherein the first end is mechanically coupled to the POS device and the first end is electrically coupled to an electrical ground, comprises positioning the second end for contact with a top edge of the payment card. When the payment card is inserted into the ICC socket and the top edge comes into contact with the second end, the first end and the second end form a first electrical path for electrostatic discharge between the payment card and the electrical ground.

In one or more of the above examples, as the payment card is inserted, a spring action causes the second end to exert an increasing force against the edge of the payment card.

In one or more of the above examples, the second end comprises a curved segment and the curved segment comes into contact with the edge.

In one or more of the above examples, the spring member is made using a conductive material.

In one or more of the above examples, the conductive material is a metal.

In one or more of the above examples, the spring member is a pin.

In one or more of the above examples, the exerting of the increasing force lowers an impedance of the first electrical path.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding, reference is now made to the following description taken in conjunction with the accompanying Drawings in which.

DETAILED DESCRIPTION

Figure 1:
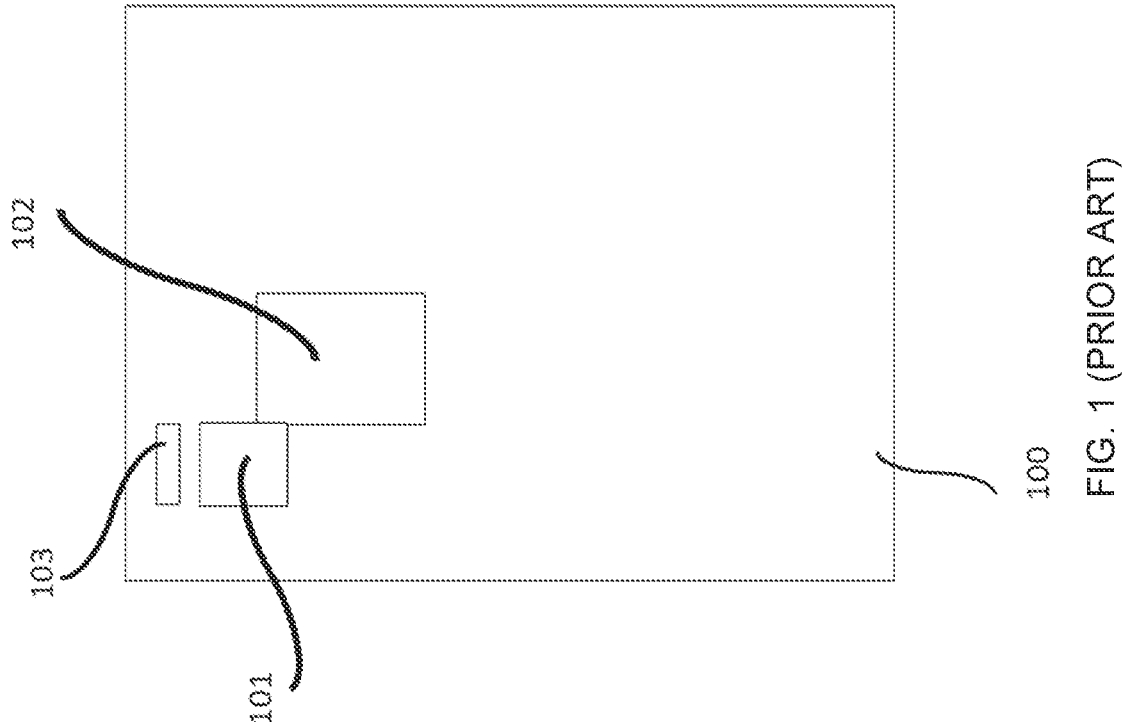
FIG. 1 illustrates an example embodiment of an integrated circuit card (ICC) socket used in point-of-sale (POS) systems.

Referring now to the drawings, wherein like reference numbers are used herein to designate like elements throughout, the various views and embodiments of systems and methods for electrostatic discharge protection are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Electrostatic discharge (ESD) protection is important for consumer electronics as ESD can lead to permanent damage in electronic devices and subsystems. In particular, Point-of-Sale (POS) systems are prone to ESD. For example, users can introduce ESD to a POS device via pressing a keypad or inserting the credit cards into the POS for transactions. The increasing popularity of metal payment cards worsens the ESD problem as ESD can now occur via the metal card and lead to permanent damage to the POS device.

The problem is further detailed below with reference to FIGS. 1-3.

FIG. 1 shows an example embodiment of an integrated circuit card (ICC) or chip card socket 100 used in POS systems. Card detection switch 101 is coupled to ground connection 103, which in turn is coupled to an electrical ground. 8-pin ICC contact block 102 contacts the chip on an ICC or chip card to read it. The socket 100 is in contact with at least the edges of the payment card.

Figures 2A, 2B:
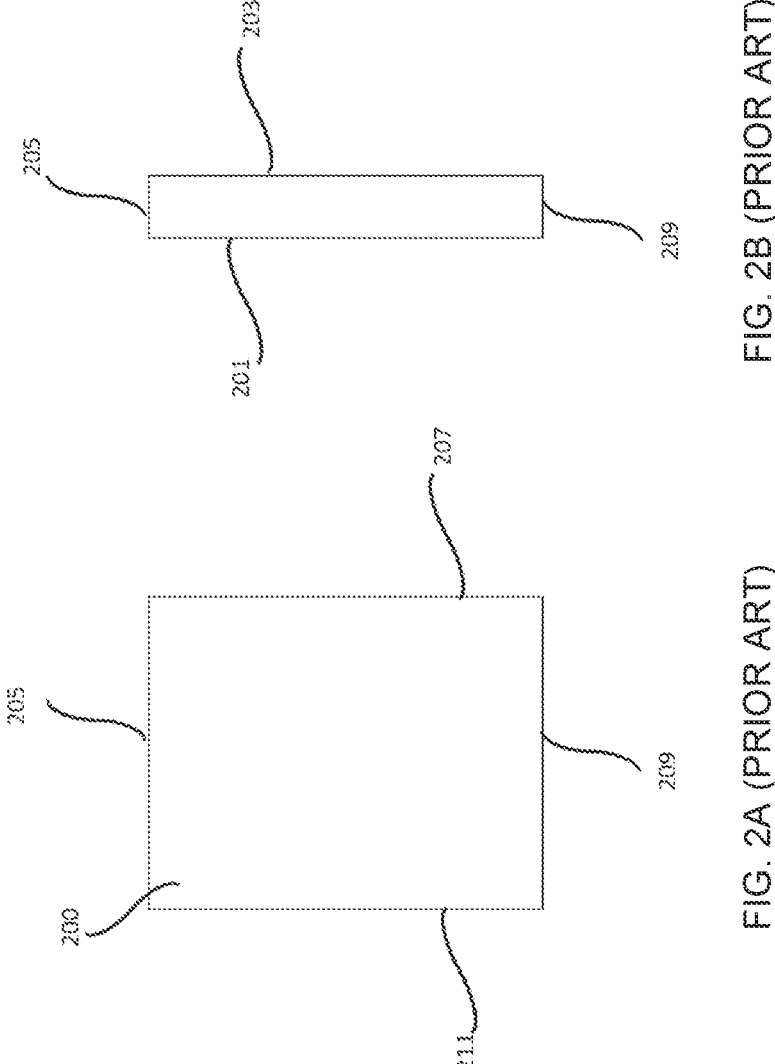
FIG. 2A illustrates a front view of an example embodiment of a payment card.
FIG. 2B illustrates a side view of an example of a payment card.

FIGS. 2A and 2B show front and side views of an example embodiment of a payment card 200. Surfaces 201 and 203 are electrically isolated from each other. Top edge 205, right edge 207, bottom edge 209 and left edge 211 are electrically conductive.

Figure 3:
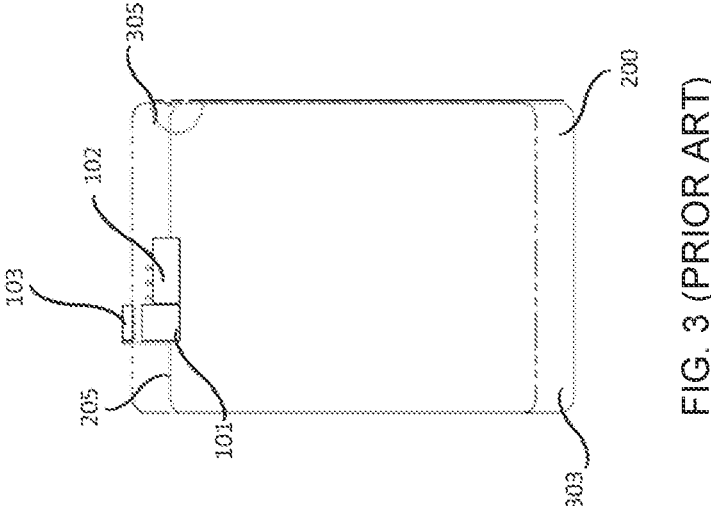
FIG. 3 illustrates electrostatic discharge (ESD) when a first user inserts a payment card.

As shown in FIG. 3, when a first user inserts card 200 from first position 303 to second position 305, ESD occurs from edge 205 via card detection switch 101 to ground via connection 103, thereby protecting 8-pin ICC contact block 102 from permanent damage.

However, when payment card 200 is fully inserted into an ICC socket in second position 305, conductive card edge 205 is no longer in electrical contact with card detection switch 101. Card 200 is still in contact with contact block 102. When, for example, a source of charge such as a second user comes into contact with the card 200 at fully inserted second position 305, this may lead to ESD through contact block 102 and consequently device failure.

Systems and methods to protect against ESD which overcome these failings in prior art systems are detailed in the specification below.

Figure 4:
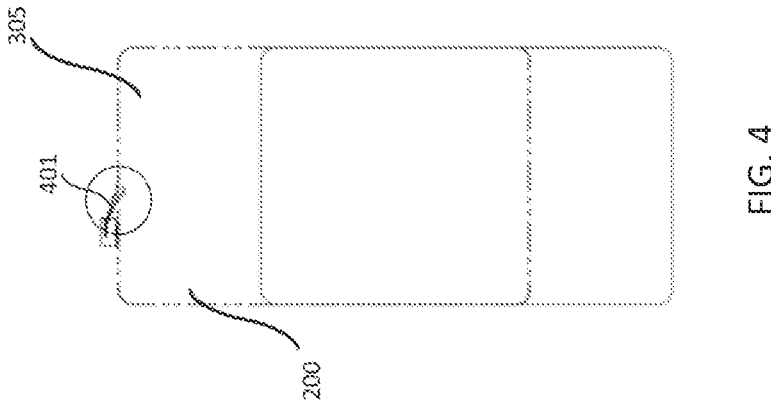
FIG. 4 illustrates an example embodiment of a spring or top contact member for ESD protection of POS devices.
Figure 5:
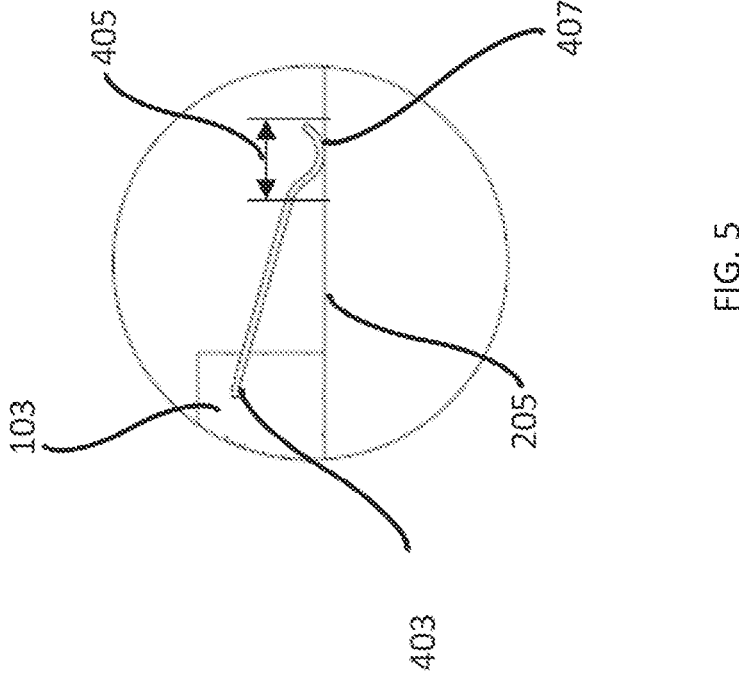
FIG. 5 illustrates an enlarged view of a spring or top contact member.

FIGS. 4 and 5 show an example embodiment of a spring or top contact member 401 for ESD protection of POS devices. FIG. 5 shows an enlarged view of spring member 401. The spring or top contact member 401 can be used with POS devices that include the ICC 100 and/or the payment card 200 as described with respect to FIGS. 1-3. Spring member 401 is made of a suitably conductive material such as a metal. In the embodiments shown in FIGS. 4 and 5, spring member 401 is a pin. Spring member 401 comprises ends 403 and 407 electrically coupled to each other. End 407 comprises curved segment 405 that comes into contact with the top edge 205. End 407 is positioned such that: As the payment card 200 is moved into fully inserted second position 305, curved segment 405 comes into contact with conductive card edge 205, and continues being in contact when payment card 200 is in fully inserted second position 305. End 403 is electrically and mechanically coupled to ground via connection 103. Then, spring member 401 provides a low impedance electrical path for any ESD to pass through to ground, without damaging contact block 102. One of skill in the art would understand that as card insertion continues, the spring action causes curved segment 405 to exert an increasing force against edge 205, thereby improving contact between curved segment 405 and edge 205 and lowering the impedance of the electrical path further.

In some embodiments, the length of the spring or top contact member 401 is selected to ensure that there is always a low impedance path for ESD to pass through to ground between conductive card edge 205 and connection 103. In yet other embodiments, the spring or top contact member 401 is suitably angled to ensure that there is always a low impedance path for ESD.

While an example of a spring member as a pin with a curved segment has been shown, one of skill in the art would understand that any suitable form and shape can be used, as long as a low impedance path from edge 205 to ground is provided. For example, a V-shaped segment, or an L-shaped segment could be used as well.

In some embodiments, a plurality of spring or top contact members are coupled to ground via connection 103. Having multiple spring or top contact members offer multiple low impedance paths to ground, when these come into contact with conductive card edge 205.

Figure 6:
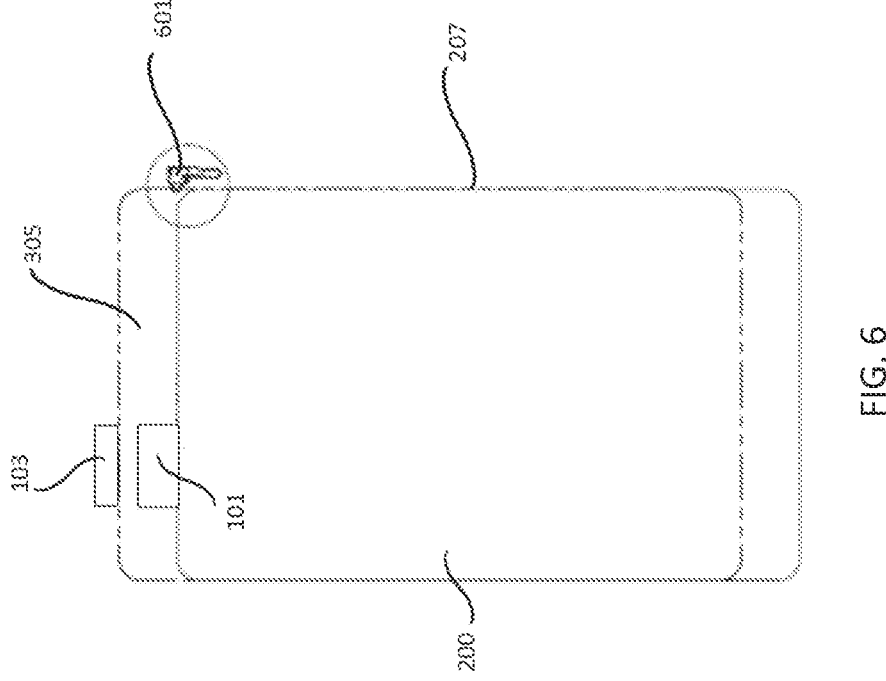
FIG. 6 illustrates an example embodiment of a side contact member for ESD protection of POS devices.
Figure 7:
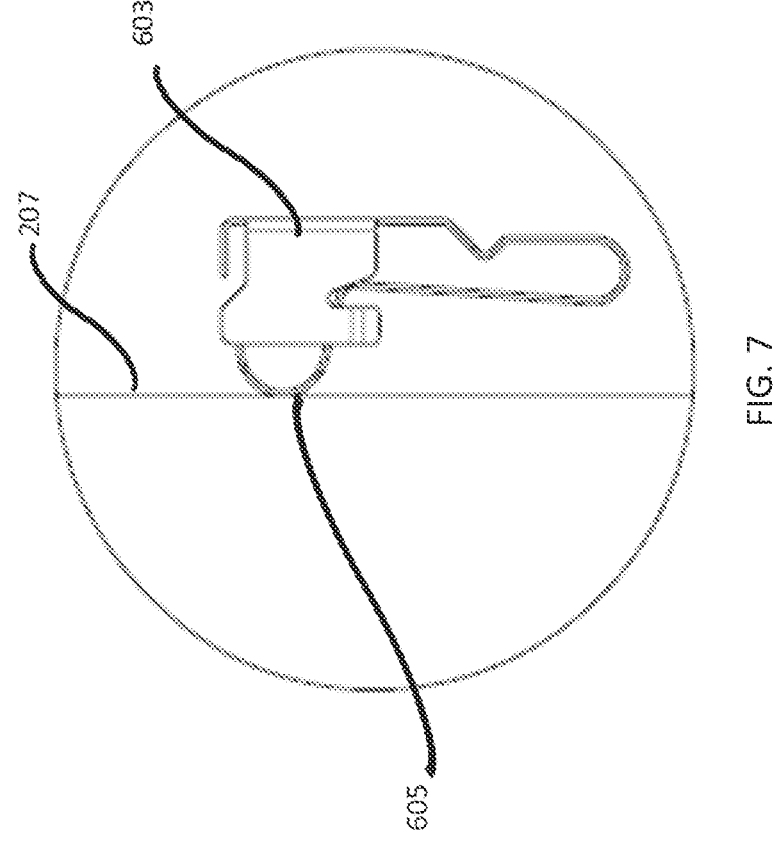
FIG. 7 illustrates an enlarged view of a side contact member.

FIGS. 6 and 7 show an example embodiment of a side contact member 601 for ESD protection of POS devices to contact a side edge of the payment card 200. FIG. 7 shows an enlarged view of contact member 601. Contact member 601 is made of a suitably conductive material such as a metal. A first end 603 of contact member 601 is coupled to the electrical ground. End 603 is electrically coupled to second end 605 of contact member 601. Second end 605 of contact member 601 is positioned for contact with right edge 207 when the card enters position 305. When the card enters fully inserted position 305, a low impedance electrical path for ESD from edge 207 to the ground is provided. One of skill in the art would appreciate that while an example of a contact member has been shown in FIGS. 6 and 7, there are other possible configurations which can be considered for the contact member. For example, the position of contact member 601 can be varied as needed. While an example embodiment has been shown where the contact member 601 contacts a right edge 207, one of skill in the art would understand that the contact member 601 could be positioned to contact left edge 211. In some embodiments, side contact member 601 comprises a spring mechanism which exerts a force against right edge 207, so as to improve the contact between end 603 and right edge 207 and thereby lower the impedance of the path to ground.

In other embodiments, there are a plurality of side contact members so as to provide multiple low impedance paths to ground. In some of these embodiments, there is at least one side contact member which contacts left edge 211 and at least one side contact member which contacts right edge 207.

While second end 605 is shown in FIG. 7 as having a curved shape, one of skill in the art would understand that other shapes are also possible, as long as a low impedance path from the edge to ground for ESD is provided. Examples include a V-shaped second end or an L-shaped second end.

In another embodiment, the sides of the socket which comes into contact with the edges are made using electrically conductive plastic material. In some embodiments, electrically conductive plastic materials are created by adding special types of carbon to different plastics so as to reduce surface resistivity. An example of such an electrically conductive plastic for reduction of ESD is given in "Electrically Conductive Plastics", located at https://www.simona.de/en/service/atex/simona-solutions/electrically-conductive-plastics/published Jan. 12, 2016; retrieved Sep. 5, 2021. Then, when the sides of the socket made from such electrically conductive plastics are connected to an electrical ground, the sides of the socket form a low impedance path for ESD. When the edges of a payment card come into contact with the sides of the socket, ESD flows through to the electrical ground.

It will be appreciated by those skilled in the art having the benefit of this disclosure that this system and method for electrostatic discharge protection provides protection for POS devices. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for prevention of electrostatic discharge from edges of a payment card to a point of sale (POS) device comprising an integrated circuit card (ICC) socket, the system comprising:

a first spring member disposed at an end of the ICC socket opposite an opening of the ICC socket, the first spring member comprising a first end electrically coupled to a second end, wherein:

the first end of the first spring member is electrically coupled to a first electrical ground, the first end of the first spring member is mechanically coupled to the POS device, and the second end of the first spring member is positioned for contact with a top edge of the payment card, the top edge being a leading edge of the payment card when inserted into the ICC socket;

a second spring member disposed at a side of the ICC socket perpendicular to an opening of the ICC socket, the second spring member comprising a first end electrically coupled to a second end, wherein:

the first end of the second spring member is electrically coupled to a second electrical ground, the first end of the second spring member is mechanically coupled to the POS device, and the second end of the second spring member is positioned for contact with a side edge of the payment card; and the system is configured such that when the payment card is inserted into the ICC socket: (i) the top edge comes into contact with the second end of the first spring member, the first end and the second end of the first spring member form a first electrical path for electrostatic discharge between the payment card and the first electrical ground, and (ii) the side edge comes into contact with the second end of the second spring member, the first end and the second end of the second spring member form a second electrical path for electrostatic discharge between the payment card and the second electrical ground, and the second end of the first spring member remains in contact with the top edge and the second end of the second spring member remains in contact with the side edge of the payment card while the payment card is inserted in the ICC socket.

2. The system of claim 1, wherein as the payment card is inserted, a spring action causes the second end of the second spring member to exert a force against the side edge of the payment card in a direction that is perpendicular to the insertion direction and perpendicular to each face of the payment card.

3. The system of claim 1, wherein the second end of the first spring member comprises a first curved segment, and the first curved segment comes into contact with the top edge, and wherein the second end of the second spring member comprises a second curved segment, and the second curved segment comes into contact with the side edge.

4. The system of claim 1, wherein the first spring member and the second spring member are made using a conductive material.

5. The system of claim 4, wherein the conductive material is a metal.

6. The system of claim 1, wherein the first spring member is a pin.

7. The system of claim 1, wherein:

at least one side of the ICC socket that contacts a second side edge of the payment card when the payment card is inserted into the POS device is made from an electrically conductive plastic;

the at least one side of ICC socket is electrically coupled to the electrical ground;

whereby when the side edge of the payment card comes into contact with the at least one side of ICC socket, a third electrical path for electrostatic discharge between the payment card and the electrical ground is formed, and at least one of the first end and the second end remains in contact with a corresponding spring member and the at least one side of the ICC socket remains in contact with the second side edge while the payment card is inserted in the ICC socket.

8. The system of claim 2, wherein the exerting of the increasing force lowers an impedance of the second electrical path.

9. A system for prevention of electrostatic discharge from edges of a payment card to a point of sale (POS) device comprising an integrated circuit card (ICC) socket, the system comprising:

a first contact element disposed at an end of the ICC socket opposite an opening of the ICC socket, the first contact element comprising a first end electrically coupled to a second end, wherein: the first end of the first contact element is electrically coupled to an electrical ground, and the second end of the first contact element is positioned for contact with a top edge of the payment card, the top edge being a leading edge of the payment card when inserted into the ICC socket;

a second contact element disposed at side of the ICC socket perpendicular to an opening of the ICC socket, the second contact element comprising a first end electrically coupled to a second end, wherein: the first end of the second contact element is electrically coupled to an electrical ground, and the second end of the second contact element is positioned for contact with a side edge of the payment card; and the system is configured such that when the payment card is inserted into the ICC socket: (i) the top edge comes into contact with the second end of the first contact element, the first end and the second end of the first contact element form a first electrical path for electrostatic discharge between the payment card and the electrical ground, and (ii) the side edge comes into contact with the second end of the second contact element, the first end and the second end of the second contact element form a second electrical path for electrostatic discharge between the payment card and the electrical ground, and the second end of the first contact element remains in contact with the top edge and the second end of the second contact element remains in contact with the side edge of the payment card while the payment card is inserted in the ICC socket.

10. The system of claim 9, wherein the second contact element comprises a spring mechanism which exerts a force against the side edge in a direction that is perpendicular to an insertion direction of the payment card into the ICC socket and perpendicular to each face of the payment card.

11. The system of claim 10, wherein the exerting of the force improves the contact between the second end of the second contact element and the side edge, thereby lowering an impedance of the second electrical path for electrostatic discharge.

12. The system of claim 9, wherein the side edge is a left side edge of the payment card, and the system comprises a third contact element disposed at a second side of the ICC socket opposite the side of the ICC socket and is perpendicular to an opening of the ICC socket, and the third contact element is disposed to come into contact with a right side edge of the payment card while the second contact element is in contact with the left side edge of the payment card.

13. The system of claim 9, wherein:

at least one side of the ICC socket that contacts a second side edge of the payment card when the payment card is inserted into the POS device is made from an electrically conductive plastic;

the at least one side of ICC socket is electrically coupled to the electrical ground;

whereby when the side edge of the payment card comes into contact with the at least one side of ICC socket, a third electrical path for electrostatic discharge between the payment card and the electrical ground is formed, and at least one of the first end and the second end remains in contact with a corresponding spring member and the at least one side of the ICC socket remains in contact with the second side edge while the payment card is inserted in the ICC socket.

14. A method for prevention of electrostatic discharge from a payment card to a point of sale (POS) device, wherein the POS device comprises an integrated circuit card (ICC) socket, a first spring member, and a second spring member, the first disposed at an end of the ICC socket opposite an opening of the ICC socket, the first spring member including a first end electrically coupled to a second end, wherein the first end of the first spring member is electrically coupled to a first electrical ground and the first end of the first spring member is mechanically coupled to the POS device, and the second spring member disposed at side of the ICC socket perpendicular to an opening of the ICC socket, the second spring member including a first end electrically coupled to a second end, wherein the first end of the second spring member is mechanically coupled to the POS device and the first end of the second spring member is electrically coupled to a second electrical ground, the method comprising:

positioning the second end of the first spring member for contact with a top edge of the payment card, the top edge being a leading edge of the payment card when inserted into the ICC socket; and positioning the second end of the second spring member for contact with a side edge of the payment card, wherein when the payment card is inserted into the ICC socket: (i) the top edge comes into contact with the second end of the first spring member, the first end and the second end of the first spring member form a first electrical path for electrostatic discharge between the payment card and the first electrical ground, and (ii) the side edge comes into contact with the second end of the second spring member, the first end and the second end of the second spring member form a second electrical path for electrostatic discharge between the payment card and the second electrical ground, and the second end of the first spring member remains in contact with the top edge and the second end of the second spring member remains in contact with the side edge of the payment card while the payment card is inserted in the ICC socket.

15. The method of claim 14, wherein as the payment card is inserted, a spring action causes the second end of the second spring member to exert a force against the edge of the payment card in a direction that is perpendicular to an insertion direction of the payment card into the ICC socket and perpendicular to each face of the payment card.

16. The method of claim 14, wherein:

the second end of the first spring member comprises a first curved segment, and the first curved segment comes into contact with the top edge;

the second end of the second spring member comprises a second curved segment; and the second curved segment comes into contact with the side edge.

17. The method of claim 14, wherein the first spring member and the second spring member are made using a conductive material.

18. The method of claim 17, wherein the conductive material is a metal.

19. The method of claim 14, wherein the first spring member is a pin.

20. The method of claim 15, wherein the exerting of the increasing force lowers an impedance of the second electrical path.

* * * * *